US012734623B2

(12) United States Patent
Modig

(10) Patent No.: US 12,734,623 B2
(45) Date of Patent: Sep. 15, 2026

(54) MACHINING DEVICE FOR MACHINING A WORKPIECE AND A METHOD THEREOF

(71) Applicant: Modig Machine Tools AB, Kalmar (SE)

(72) Inventor: David Modig, Kalmar (SE)

(73) Assignee: Modig Machine Tools AB, Kalmar (SE)

(*) Notice: Subject to any disclaimer, the term of this patent is extended or adjusted under 35 U.S.C. 154(b) by 398 days.

(21) Appl. No.: 18/257,211

(22) PCT Filed: Jan. 20, 2022

(86) PCT No.: PCT/EP2022/051288
§ 371 (c)(1),
(2) Date: Jun. 13, 2023

(87) PCT Pub. No.: WO2022/157276
PCT Pub. Date: Jul. 28, 2022

(65) Prior Publication Data

US 2024/0042562 A1 Feb. 8, 2024

(30) Foreign Application Priority Data

Jan. 22, 2021 (SE) .................................... 2150073-1

(51) Int. Cl.
*B23Q 1/62* (2006.01)
*B23Q 11/00* (2006.01)

(52) U.S. Cl.
CPC .......... *B23Q 1/621* (2013.01); *B23Q 11/0053* (2013.01); *B23Q 11/0067* (2013.01)

(58) Field of Classification Search
CPC .. B23Q 1/5437–5443; B23Q 1/62–628; B23Q 1/01–017; B23B 2270/30; B23B 2270/34; B23C 1/06; B23C 1/14
See application file for complete search history.

(56) References Cited

U.S. PATENT DOCUMENTS 6,387,026 B1 5/2002 Schweizer
7,150,706 B2 * 12/2006 Grob ...................... B23Q 39/02 409/172

(Continued)

FOREIGN PATENT DOCUMENTS

CN 109227280 A 1/2019
CN 109465641 A 3/2019

(Continued)

OTHER PUBLICATIONS

Hessbruggen. DE102011103321B4. Original Copy and Machine translation (Year: 2015).*

(Continued)

*Primary Examiner* — Tyrone V Hall, Jr.
(74) *Attorney, Agent, or Firm* — Kolitch Romano Dascenzo Gates LLP

(57) ABSTRACT

A machining device is provided. The machining device includes a trunnion table adapted to hold a workpiece and arranged to pivot around a pivot axis using a pivoting motor. The pivot axis is parallel to a horizontal plane. A spindle is adapted to hold a cutting tool directed upwards and arranged to be moved in a plane parallel to the horizontal plane by a spindle transporting device. A trunnion table transporting device is adapted to vertically transport the trunnion table towards and away from the cutting tool, such that in a cutting state, chips cut from the workpiece are removed from the workpiece by gravity.

18 Claims, 8 Drawing Sheets

(56) References Cited

U.S. PATENT DOCUMENTS

| | | | | |
|---|---|---|---|---|
| 2003/0053875 | A1* | 3/2003 | Pasquetto | B23Q 16/02 409/203 |
| 2004/0154157 | A1 | 8/2004 | Hessbruggen et al. | |
| 2008/0187406 | A1* | 8/2008 | Kai | B23Q 1/626 409/137 |
| 2011/0062642 | A1* | 3/2011 | Yabe | B23Q 1/5437 269/37 |
| 2012/0301253 | A1 | 11/2012 | Hessbrueggen | |
| 2016/0256967 | A1* | 9/2016 | Kell | B23Q 1/50 |
| 2019/0030666 | A1* | 1/2019 | Haueter | B23Q 1/4857 |

FOREIGN PATENT DOCUMENTS

| | | | | |
|---|---|---|---|---|
| CN | 110026903 | A | 7/2019 | |
| DE | 10358381 | A1 | 7/2005 | |
| DE | 102009019252 | A1 | 11/2010 | |
| DE | 102011000335 | A1 | 7/2012 | |
| DE | 102013004901 | A1 | 9/2014 | |
| EP | 2277658 | A1 | 1/2011 | |
| EP | 2452770 | A2 | 5/2012 | |
| ES | 2559013 | T3 * | 2/2016 | B23B 5/18 |
| JP | 2001269827 | A | 10/2001 | |
| JP | 2001347408 | A | 12/2001 | |
| JP | 2002001624 | A | 1/2002 | |
| JP | 2002301626 | A | 10/2002 | |
| JP | 2006150576 | A | 6/2006 | |
| JP | 2006281350 | A | 10/2006 | |
| JP | 2013208667 | A | 10/2013 | |
| JP | 2018058205 | A | 4/2018 | |
| WO | 2004012888 | A1 | 2/2004 | |
| WO | 2005082572 | A1 | 9/2005 | |
| WO | 2012089563 | A1 | 7/2012 | |

OTHER PUBLICATIONS

International Search Report and Written Opinion of the International Searching Authority from the European Patent Office, in PCT/EP2022/051288 dated Mar. 29, 2022, which is an international application corresponding to this U.S. application.

Jichuang Chanpin Chuangxin Yu Sheji Machine Tool Product Innovation and Design, Southeast University Press, Nanjing, machine translated, 2014.

* cited by examiner x
y
z

MACHINING DEVICE FOR MACHINING A WORKPIECE AND A METHOD THEREOF

TECHNICAL FIELD

The present disclosure relates to machining. More particularly, it is related to a machining device for machining a workpiece and a method thereof.

BACKGROUND

Many products today contains at least one component that has been manufactured by machining. All the way from the body of a smartphone to an airplane containing thousands of machined components. The complexity of these products and components are constantly increasing. In addition, there is an increasing demand for higher and higher tolerances.

Traditional ways of manufacturing these products are by using either vertical milling machines where a workpiece is machined by a tool from above, or horizontal milling machines where the tool is working from the side. There is however need for improved solutions for machining, with higher precision and improved handling of the removed material.

SUMMARY

It is an object of the present disclosure to at least partly overcome one or more of the above-identified limitations of the prior art. In particular, it is an object to provide an improved machining device and method thereof for machining workpieces with an improved precision.

It has been realized that by having the cutting tool working from below an effective removal of chips cut from the workpiece is achieved. Further, the proposed distribution of the degrees of freedom in the machining device allows for a more stable machining device which results in improved precision.

According to a first aspect, it is provided a machining device comprising, a trunnion table adapted to hold a workpiece and arranged to pivot around a pivot axis by means of a pivoting motor, wherein the pivot axis is parallel to a horizontal plane, a spindle adapted to hold a cutting tool directed upwards and arranged to be moved in a plane parallel to the horizontal plane by a spindle transporting device, and a trunnion table transporting device adapted to vertically transport the trunnion table towards and away from the cutting tool, such that in a cutting state, chips cut from the workpiece is removed from the workpiece by gravity.

The trunnion table may be adapted to hold the workpiece in relation to the cutting tool such that in the cutting state, chips cut from the workpiece by the cutting tool is removed from the workpiece by gravity.

By the wording "cutting state" it is hereby meant a state in which the cutting tool is processing the workpiece.

Relative spatial terms such as "horizontal", "vertical", "upwards", "side" and "top" are used to refer to locations or directions within a frame of reference of the machining device. In particular, "top", "upwards" and "vertical" may be understood in relation to a bottom-up direction of the machining device (i.e. a direction from the trunnion table transporting device to the trunnion table), or equivalently a normal direction to a plane ground. Put differently, the bottom-up direction may be opposite to gravity. Correspondingly, the terms "horizontal", "beside" and "side" may be understood as locations or orientations in relation to/along the plane ground. By the wording "upwards" it is hereby meant a direction having a component in the bottom-up direction, i.e. opposite to gravity.

The spindle may be interpreted as a device which can hold and rotate the cutting tool. The cutting tool may for instance be a milling tool.

Having the vertical movement in the trunnion table means that it can be separated from the horizontal movements of the spindle. This may be advantageous in that forces created in the machining device from moving one of the parts does not affect the other. Put differently, the spindle for instance, can be moved along one direction in the horizontal plane without causing the workpiece on the trunnion table to vibrate due to the forces created by the movement. Thus, higher precision can be achieved in the machining process.

The machining device may further comprise a workpiece table rotatably connected to the trunnion table and adapted to hold the workpiece. The workpiece table may be arranged to rotate around a rotational axis. Said rotational axis may be orthogonal to the pivot axis.

An advantage of having the workpiece table which may rotate is that the workpiece can be rotated so that the cutting tool can reach all sides of the workpiece. Further, the workpiece may be rotated at high speeds so that turning can be performed by the machining device.

The machining device may comprise an additional workpiece table rotatably connected to the trunnion table and adapted to hold an additional workpiece. The additional workpiece table may be arranged to rotate around an additional rotational axis. The additional rotational axis may be orthogonal to the pivot axis. An advantage of having an additional workpiece table is that two workpieces can be machined at the same time. Alternatively, two workpieces can be loaded into the machining device at the same time and then be machined after one another.

The machining device may further comprise an additional spindle. The additional spindle may be adapted to hold an additional cutting tool directed upwards and arranged to be moved in the plane parallel to the horizontal plane by the spindle transporting device. Having an additional spindle may be advantageous in that two identical workpieces can be machined at the same time. Alternatively, the two spindles may machine one workpiece simultaneously.

The machining device may further comprise a base support structure, a side support structure, and a top connecting structure. The side support structure may be connected at a first end to the base support structure. The side support structure may be connected at a second end to the top connecting structure. The trunnion table transporting device may be connected to the side supporting structure. The spindle transporting device may be connected to the base support structure. Having the spindle transporting device connected to the base support structure can be an advantage in that the forces created when moving the spindle transporting device is picked up by the base support structure and not affecting the rest of the machining device, such as the trunnion table on which the workpiece is suspended. Similarly, having the trunnion table transporting device connected to the side supporting structure means that the vertical movements of the trunnion table doesn't affect the spindle.

The trunnion table transporting device may be connected to the side supporting structure at two opposite ends, such that the trunnion table is supported by the trunnion table transporting device at two opposite ends. Put differently, the trunnion table may be attached at two points opposite to each other along the pivot axis. An advantage of this may be that the trunnion table, on which the workpiece is attached, is much more stable as opposed to having a trunnion table attached in only one end. The stability may be important for the precision of the machining device.

The side support structure may comprise at least one opening for loading and/or unloading the workpiece horizontally.

The top connecting structure may comprise an opening arranged above the trunnion table for loading and/or unloading the workpiece vertically.

An advantage of loading the workpiece vertically is that transporting devices may run above the top connecting structure, thereby making it possible to reduce foot print in a production facility. The transporting devices may transport workpieces to and/or from the machining device.

The spindle may be movably arranged on the spindle transporting device along a first direction by means of a first motor. The spindle transporting device may be movably arranged on the base support structure along a second direction by means of a second motor. The first and second motor may be the same motor. The first direction and the second direction may be parallel to the horizontal plane. The first direction may be orthogonal to the second direction.

The spindle transporting device may move along rails attached to the base support structure.

The machining device may further comprise a chip conveyor arranged below the spindle for transporting chips away from the machining device.

By the wording “chips” it is hereby meant any material that is removed from the workpiece by the cutting tool.

The pivot axis may be parallel to the first direction. An advantage of which may be that movements of the spindle along the first direction has a minimal effect on the pivoting of the trunnion table.

According to a second aspect, it is provided a method for machining a workpiece using a machining device comprising a trunnion table holding the workpiece and a spindle holding a cutting tool directed upwards. The method comprises machining the workpiece from below by applying the cutting tool to the workpiece by, moving the spindle in a horizontal plane along a first and a second direction, wherein the first direction is orthogonal to the second direction, moving the trunnion table vertically thereby moving the workpiece, tilting the workpiece by pivoting the trunnion table around a pivot axis, wherein the pivot axis is parallel to the first direction.

The method may further comprise attaching the workpiece to the trunnion table.

The machining device may further comprise a workpiece table adapted to rotate around a rotational axis of itself and attached to the trunnion table. The workpiece may be attached to the workpiece table. The method may further comprise rotating the workpiece around the rotational axis of the workpiece table, wherein the rotational axis may be orthogonal to the pivot axis.

According to a third aspect, it is provided a non-transitory computer-readable storage medium having stored thereon program code portions for implementing the method according to the second aspect when executed on a device having processing capabilities.

Still other objectives, features, aspects and advantages of the present disclosure will appear from the following detailed description as well as from the drawings. The same features and advantages described with respect to one aspect are applicable to the other aspects unless explicitly stated otherwise.

BRIEF DESCRIPTION OF THE DRAWINGS

The above and other aspects of the present disclosure will now be described in more detail, with reference to appended figures. The figures should not be considered limiting; instead they are used for explaining and understanding.

DETAILED DESCRIPTION

Figure 1:
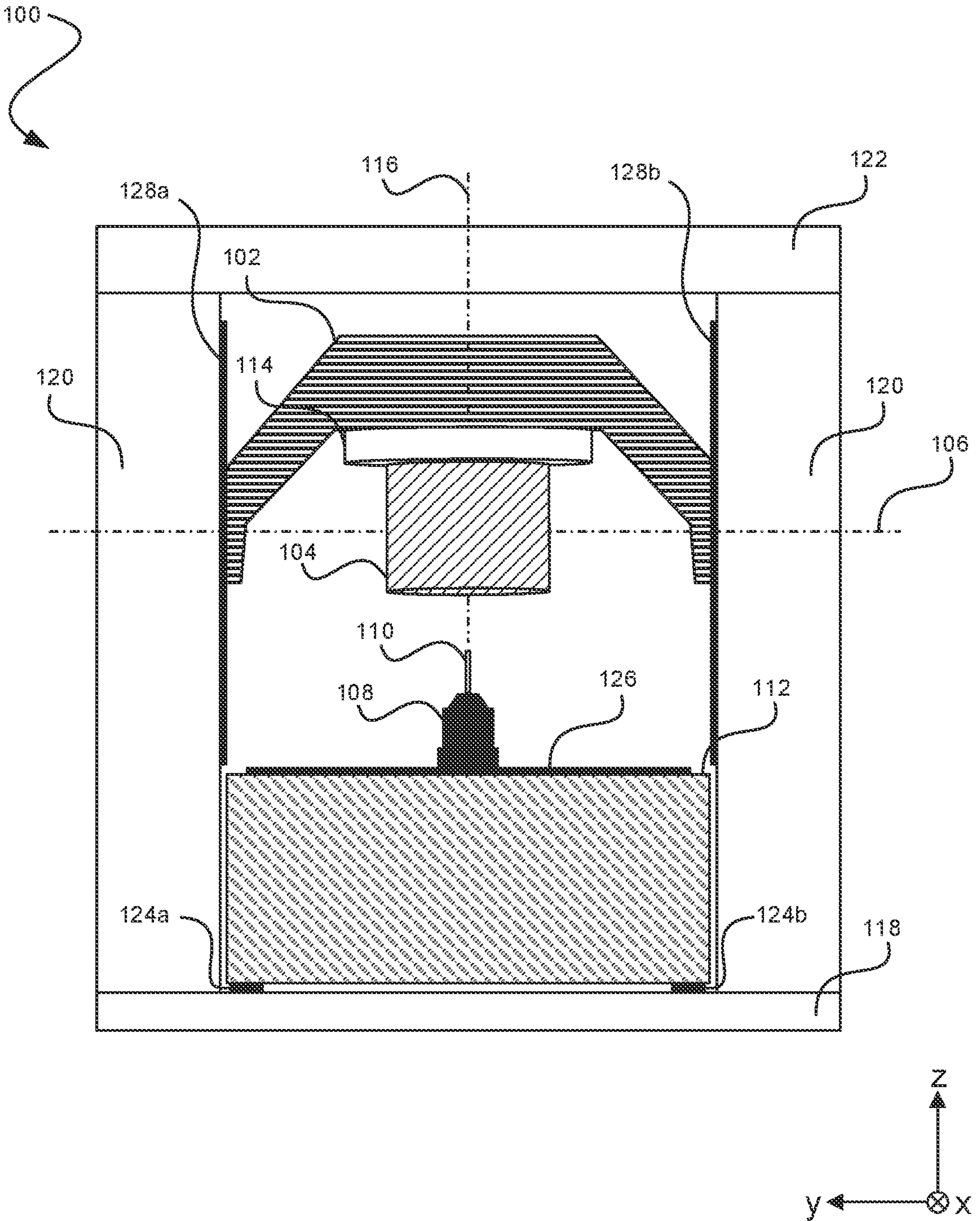
FIG. 1 illustrates, in cross-sectional view and by way of example, a machining device in an idle state.

FIG. 1 is, by way of example, an illustration of a machining device 100 in cross-sectional view. It is noted that the machining device as illustrated in any of the FIGS. 1 to 7 is to be seen as examples for illustrative purposes. The scales and shapes of the different parts may not reflect an actual machining device.

The machining device 100 may comprise a trunnion table 102. The trunnion table 102 may be adapted to hold a workpiece 104. Put differently, the workpiece 104 may be fixed to the trunnion table 102. The workpiece 104 may be attached to the trunnion table 102 by hydraulics or any other suitable means for attaching a workpiece in a machining device which can be readily understood by the skilled person. The workpiece 104 may for instance be a piece of metal which is to be machined, for example by turning, milling or drilling. The trunnion table 102 may be arranged to pivot around an pivot axis 106. Thus, also the workpiece 104, which is fixedly arranged on the trunnion table 102, may be pivoted. The trunnion table 102 can be said to have a first degree of freedom, i.e. the pivoting motion. The pivoting motion of the trunnion table 102 may be done by means of a pivoting motor. The pivot axis 106 may be parallel to a horizontal plane. For reference, the horizontal plane may be the plane spanned by the x- and y-axis. The pivot axis 106 may be parallel to the y-axis.

As illustrated herein, the trunnion table 102 may be attached at two ends opposite to each other along the pivot axis 106. Alternatively, the trunnion table 102 can be attached to only one end. Further, the area where the workpiece 104 is attached to the trunnion table 102 may have an offset from the pivot axis 106, such that a central section of the workpiece 104 can coincide with the pivot axis 106. The offset of the trunnion table 102 may vary depending on the size of the workpiece 104. For instance, the offset may be such that the center of gravity of the trunnion table 102 and the workpiece 104 together is close to the pivot axis. Thus, the trunnion table 102 with the workpiece 104 attached can pivot in a more effective and stable way and requiring less force by the pivot motor.

The machining device 100 may further comprise a spindle 108. The spindle 108 may be adapted to hold a cutting tool

110. The spindle 108 may rotate the cutting tool 110 such that milling or drilling can be performed. The spindle 108 may be arranged to hold the cutting tool 110 directed upwards, i.e. in the direction of the z-axis as herein illustrated. Put differently, the spindle 108 is arranged to machine the workpiece 104 from below, as opposed to the traditional way of vertical machining where the spindle is arranged above the workpiece. Having the spindle 108 working from below allows for an effective removal of chips 202 cut from the workpiece 104, which is further discussed in connection to FIG. 2 and FIG. 3 when the machining device 100 is in a cutting state.

The spindle 108 can be arranged to be moved in a plane parallel to the horizontal plane by a spindle transporting device 112. Thus, the spindle 108 can be said to have a second and a third degree of freedom. The spindle transporting device 112 is further discussed in connection to FIG. 7.

The machining device 100 may further comprise a trunnion table transporting device 128*a*, 128*b*. The trunnion table transporting device 128*a*, 128*b* may be adapted to vertically transport the trunnion table 102 towards and away from the cutting tool 110. Herein, the trunnion table transporting device 128*a*, 128*b* is illustrated as two rails on either side of the trunnion table 102 and transporting the trunnion table along the z-axis. The trunnion table transporting device 128*a*, 128*b* can be said to provide the trunnion table 102 with a fourth degree of freedom.

The machining device 100 as discussed so far thus have four degrees of freedom and may therefore be capable of performing 4-axis machining. However, as illustrated in FIG. 1. the machining device 100 may further comprise a workpiece table 114. The workpiece table 114 may be rotatably connected to the trunnion table 102 and adapted to hold the workpiece 114. The workpiece table 114 may be rotated by means of a rotational motor. The workpiece 104 may be attached to the workpiece table 114 by use of hydraulics. In other words, the workpiece 104 may be fixed to the workpiece table 114. The workpiece table 114 may be arranged to rotate around a rotational axis 116. The rotational axis 116 may be a normal axis to the workpiece table 114. Being a normal axis to the workpiece table 114 may here mean being normal to a surface of the workpiece table 114 on which the workpiece 104 is held. The rotational axis 116 may be orthogonal to the pivot axis 106. Thus, the rotational axis 116 may pivot around the pivot axis 106 together with the trunnion table 102. The workpiece table 114 can be said to give the machining device 100 a fifth degree of freedom, thus allowing the machining device 100 to perform 5-axis machining. The workpiece table 114 may rotate the workpiece 104 such that the cutting tool 110 can reach all points of the workpiece 104. Further, the workpiece table 114 may rotate the workpiece at such high rotational speeds that turning can be performed by the machining device 100.

The machining device 100 may comprise a base support structure 118. The base support structure 118 may be any structure giving support to the machining device 100 from below. For instance it may be a machining device floor, or simply attachments for attaching the machining device 100 to a factory floor. The machining device 100 may further comprise a side support structure 120. The side support structure 120 may be connected at a first end to the base support structure 118. As one example, the side support structure 120 may be a single enclosed body. As another example, the side support structure may comprise one or more pillars. For example, four pillars arranged in four corners of the machining device 100. The machining device may further comprise a top connecting structure 122. The side support structure 120 may be connected at a second end to the top connecting structure 122. The top connecting structure 122 may connect the side support structure 120 and giving the machining device additional stability. The top connecting structure 122 may be a single enclosed body. Alternatively, the top connecting structure 122 may comprise one or more beams connecting the side support structure 120. In the exemplifying case of the support structure 120 comprising four pillars, the top connecting structure 122 may comprise four beams which pairwise connects the four beams.

The trunnion table transporting device 128*a*, 128*b* may be connected to the side support structure 120. The spindle transporting device may be connected to the base support structure 118. The spindle transporting device 112 may move along rails 124*a*, 124*b* attached to the base support structure 118.

The trunnion table transporting device 128*a*, 128*b* may be connected to the side support structure 120 at two opposite ends. In other words, the trunnion table 102 may be supported by the trunnion table transporting device 128*a*, 128*b* at two opposite ends.

In the illustration of FIG. 1, the machining device 100 may be referred to as being in an idle state. In this state, the workpiece 104 is loaded in the machining device 100, but the cutting tool is currently not in contact with the workpiece.

Figure 2:
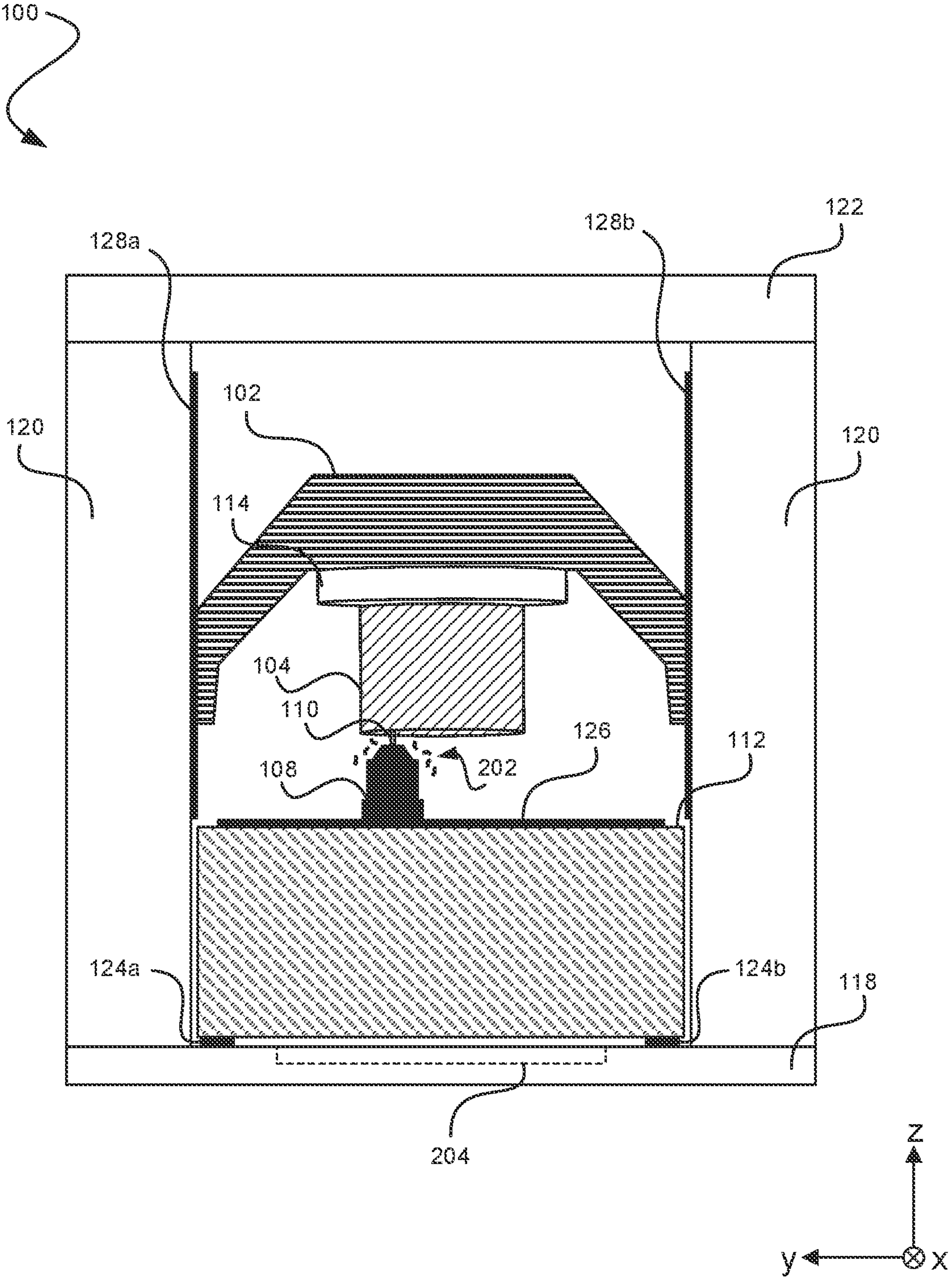
FIG. 2 illustrates the machining device in FIG. 1 in a cutting state.

FIG. 2 illustrates the machining device 100 in a cutting state. In this illustration, the trunnion table transporting device 128*a*, 128*b* has transported the workpiece 104 towards the cutting tool 110 such that the cutting tool 110 can machine the workpiece 104. Chips 202 that are created from material being removed from the workpiece 104 can fall away from the workpiece by gravity due to the spindle 108 working from below the workpiece 104. During the cutting state, the cutting tool 110 is below (in relation to the z-axis) a point of the workpiece 104 at which the cutting tool is in contact with. The machining device 100 may be arranged such that the cutting tool 110 always is below the point of the workpiece 104 at which the cutting tool 110 is in contact with during the cutting state. Removing the chips 202 from the workpiece 104 during the cutting state can improve the finish of the product. By the proposed solution the chips can be prevented from collecting in or on the workpiece during the cutting state. The machining device 100 may further comprise a chip conveyor 204 for transporting chips away from the machining device 100. The chip conveyor 204 may be arranged below the spindle. The chip conveyor 204 may for instance be incorporated in the base support structure 118 or attached thereon. Alternatively, the chip conveyor 204 may comprise an opening in the base support structure 118 allowing the chips 202 to fall out from the machining device 100. The chips 202 can also be removed by that the spindle transporting device 112 is provided with slanted surfaces.

Figure 3:
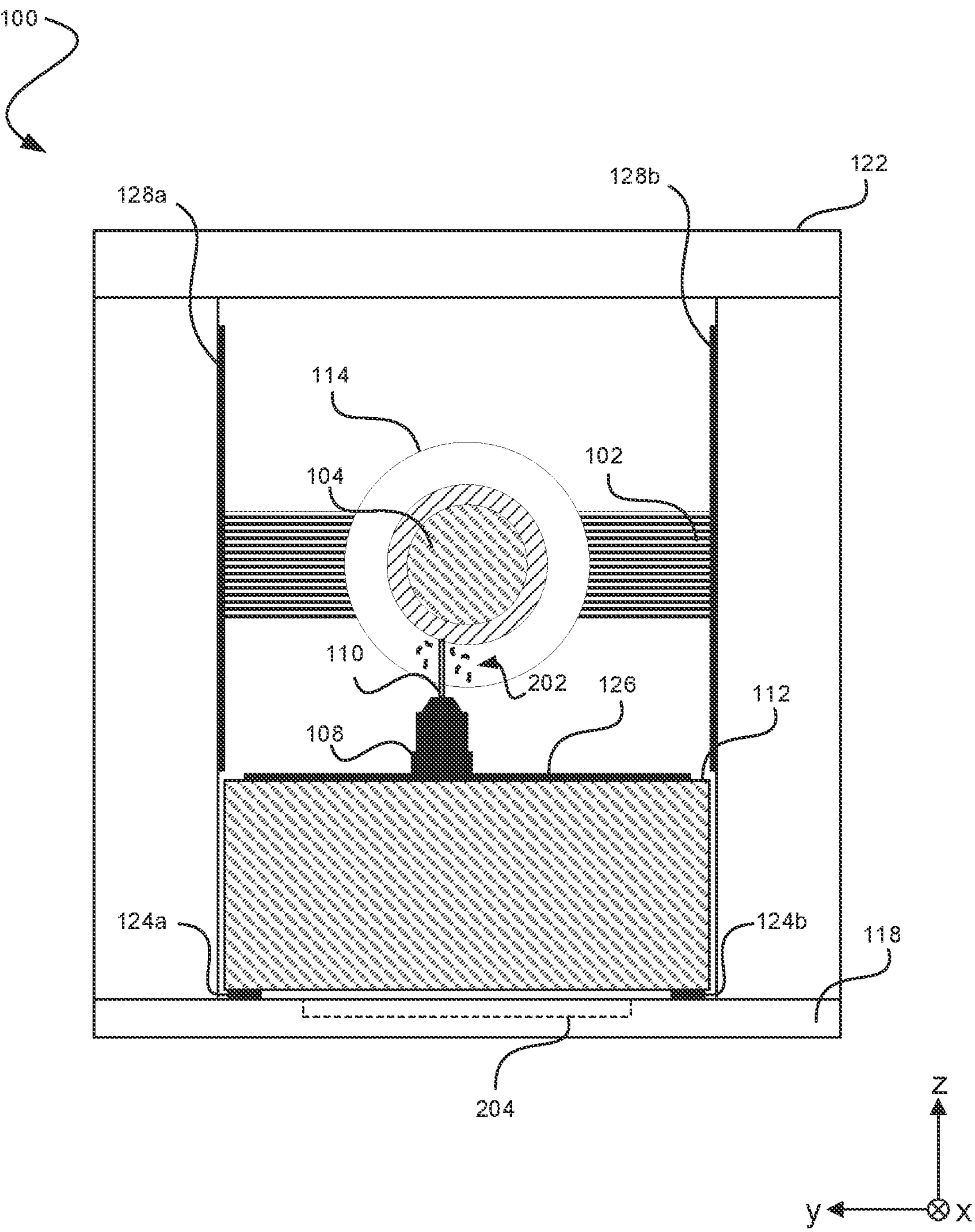
FIG. 3 illustrates another example of the machining device in FIG. 1 in the cutting state.

FIG. 3 illustrates an alternative view of the machining device 100 in the cutting state. In this illustration, the trunnion table 102 has pivoted around the pivot axis 106 allowing the cutting tool 110 to reach points on a side of the workpiece 104. It is noted that the trunnion table 102 may take any pivoted position around the pivot axis 106, not just the two examples of FIG. 2 and FIG. 3.

Figure 4:
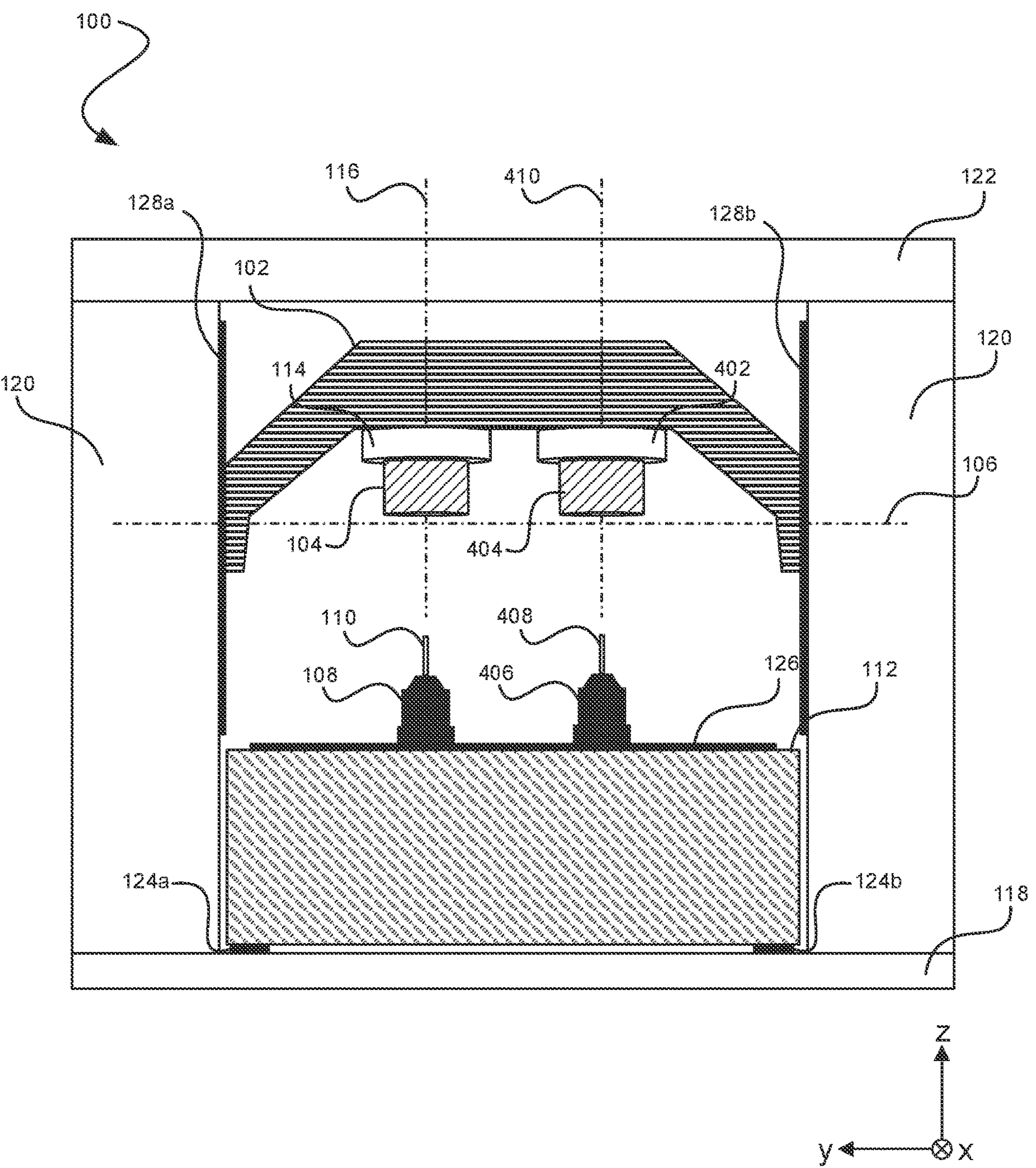
FIG. 4 illustrates, by way of example, a machining device having more than one spindles and more than one workpiece tables.

FIG. 4 illustrates, by way of example, the machining device 100 having an additional workpiece table 402 and an additional spindle 406.

The additional workpiece table 402 may be rotatably connected to the trunnion table 102 and adapted to hold an additional workpiece 404. The additional workpiece table 402 may be arranged to rotate around an additional rotational axis 410. The additional rotational axis may be orthogonal to the pivot axis. As illustrated herein, the additional workpiece table 402 may be arranged beside the workpiece table 114.

The additional spindle 406 may be adapted to hold an additional cutting tool 408 directed upwards. The additional spindle 406 may be arranged to be moved in the plane parallel to the horizontal plane by the spindle transporting device 112. The two spindles 108, 406 may be arranged on the spindle transporting device 112 with a fixed distance between them.

The machining device 100 as illustrated herein may be used to simultaneously machine two identical workpieces 104, 404. Alternatively, the machining device 100 may be used to machine one workpiece 104 using two spindles 108, 406. Alternatively, the machining device 100 may be used to machine two workpieces 104, 404 using one spindle 108.

Figure 5:
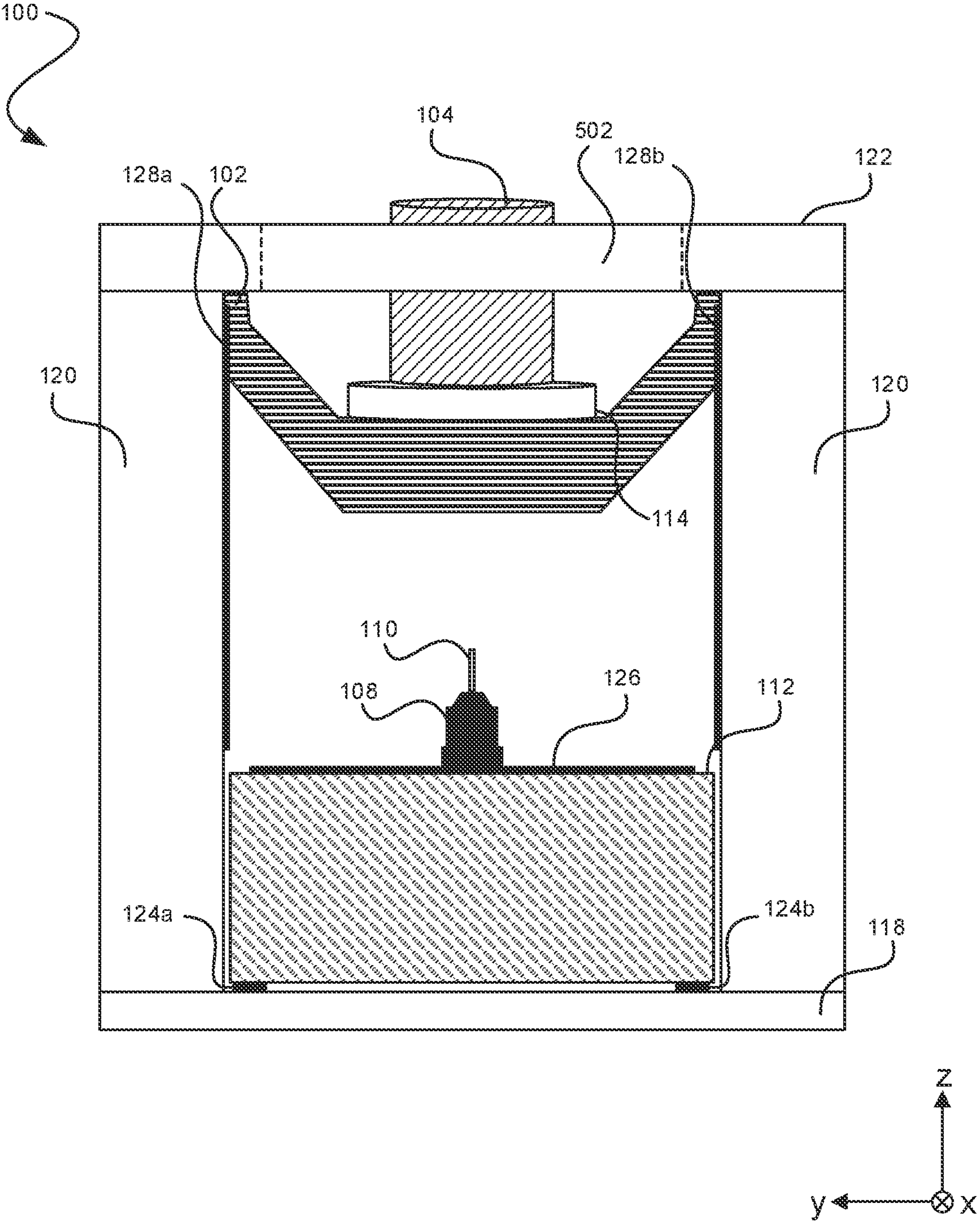
FIG. 5 illustrates the machining device in FIG. 1 in a vertical loading state.

FIG. 5 illustrates the machining device in a vertical loading state. An opening 502 may be provided in the top connecting structure 122. The opening 502 may be provided above the trunnion table 102 for loading and/or unloading the workpiece 104 vertically. Put differently, the machining device 100 may be loaded and/or unloaded from above. In the vertical loading state, the trunnion table 102 may be pivoted so that the workpiece 104 can be accessed from above. Further, the trunnion table transporting device 128*a*, 128*b* can raise the trunnion table to a top position so that the workpiece 104 is easily accessible. The vertical loading state of the machining device 100 may be compatible with pallet changers moving above the machining device 100 for loading and/or unloading.

Figure 6:
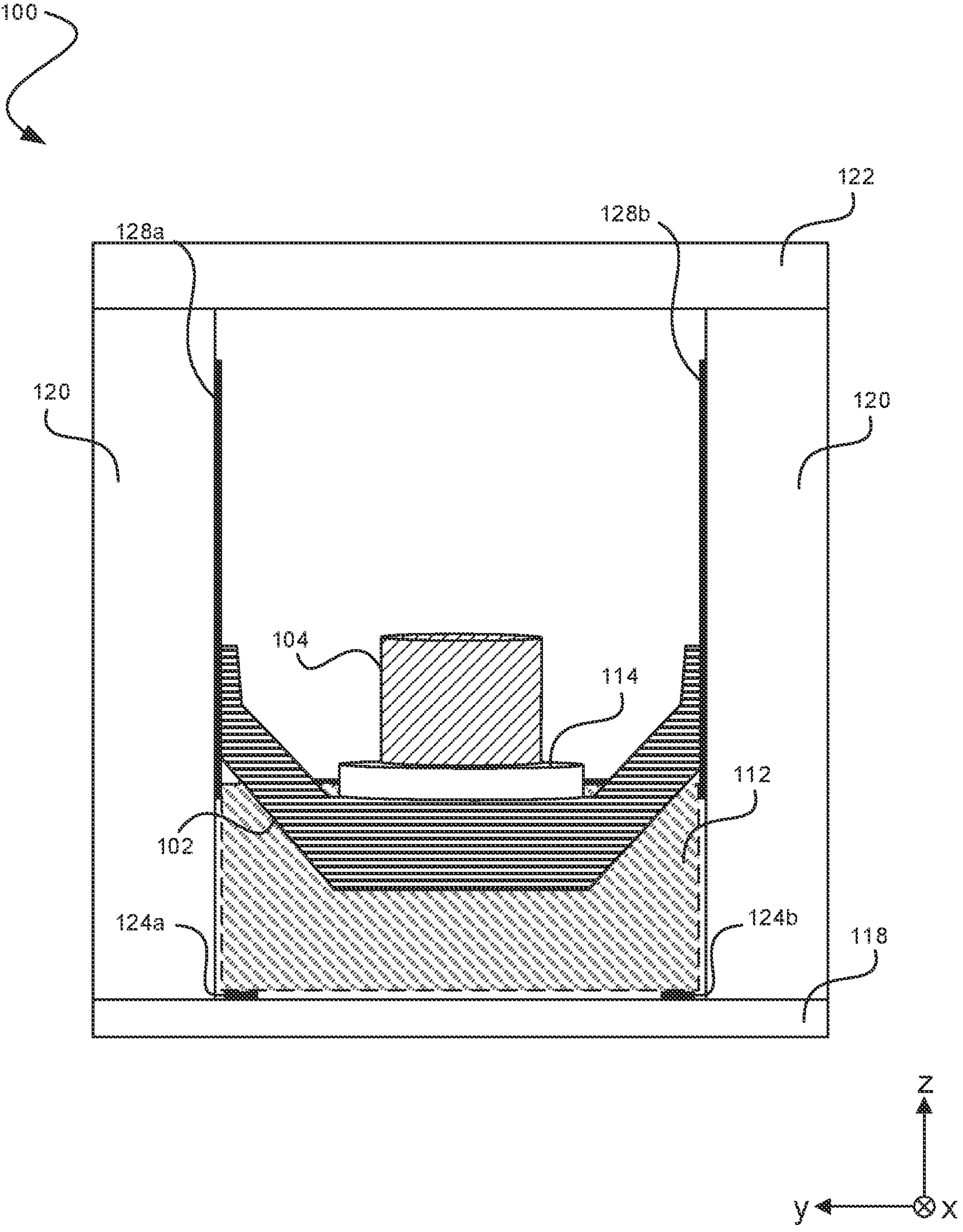
FIG. 6 illustrates the machining device in FIG. 1 in a horizontal loading state.

FIG. 6 illustrates the machining device in a horizontal loading state. The side support structure 120 may comprise at least one opening for loading and/or unloading the workpiece 104 horizontally. Put differently, the machining device 100 may be loaded and/or unloaded from the side. As an example, the side support structure 120 may be provided with openings at the two sides of the side support structure 120 where the trunnion table transporting device 128*a*, 128*b* is not attached.

In the horizontal loading state, the spindle transporting device 112 can move away from the opening from where the workpiece 104 is to be loaded or unloaded, thus allowing the workpiece 104 to be positioned at a height suitable for the loading/unloading. The horizontal loading state of the machining device 100 may be compatible with pallet changers for loading and/or unloading.

Figure 7:
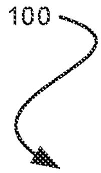
FIG. 7 illustrates the machining device in cross-sectional top view.
Figure 7:
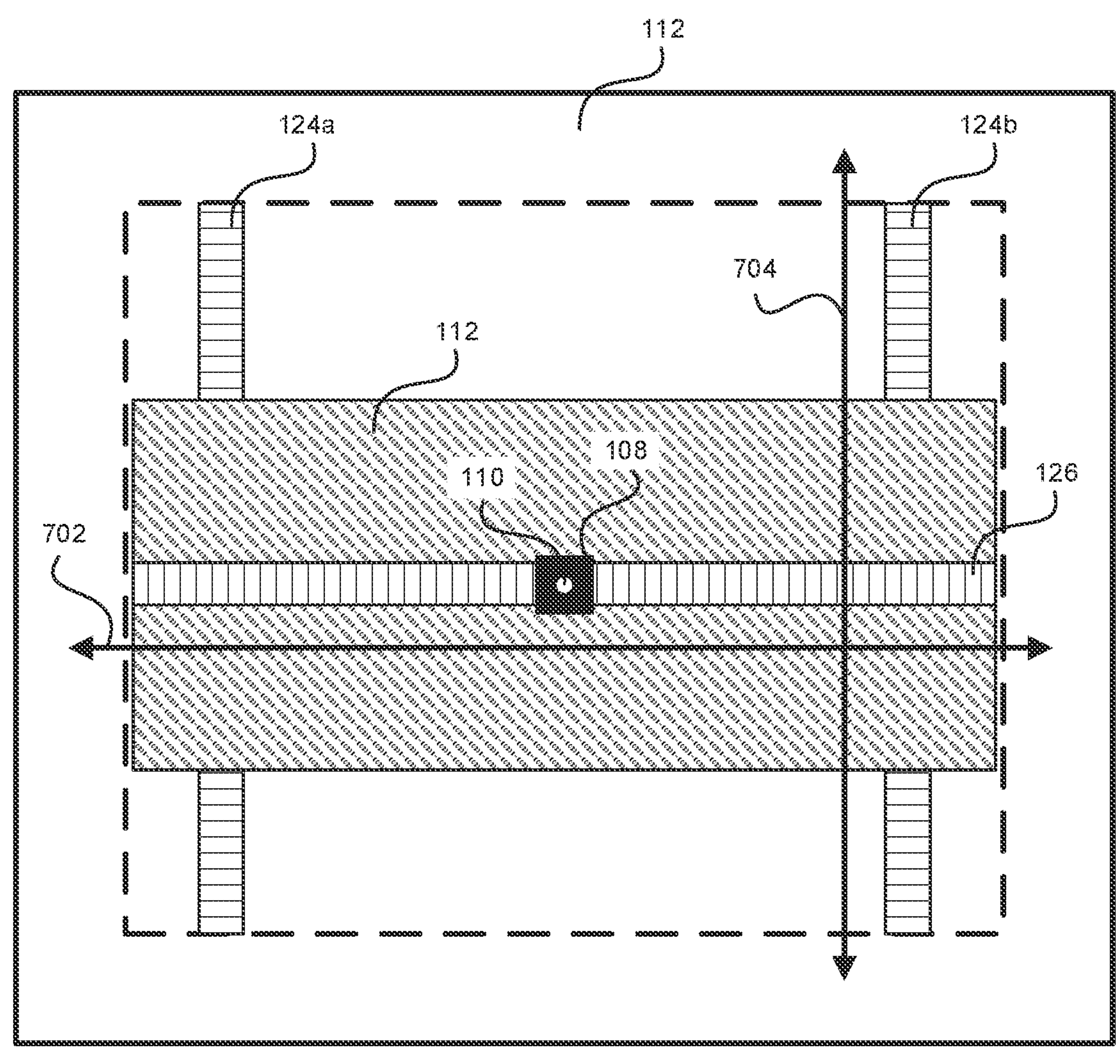

FIG. 7 illustrates the machining device 100 in a cross-sectional view from above, with an opening in the top connecting structure 122. More specifically, FIG. 7 illustrates the spindle transporting device 112 from above. For illustrative purposes, the trunnion table 102 with the workpiece table 114 and the workpiece 104 is not included.

The spindle 108 may be movably arranged on the spindle transporting device 112 along a first direction 702. The movement may be made by means of a first motor. The first motor may be a linear motor. The spindle 108 may move along a rail 126 on the spindle transporting device 112.

The spindle transporting device 112 may be movably arranged on the base support structure 118 along a second direction 704. The movement may be made by means of a second motor. The second motor may be a linear motor. Herein, the spindle transporting device 112 is illustrated as moving along two rails 124*a*, 124*b* on the base support section 118. However, the number of rails may be one or more.

The first direction 702 and the second direction 704 may be parallel to the horizontal plane. Further, the first direction 702 may be orthogonal to the second direction 704. The pivot axis 106 may be parallel to the first direction 702.

Figure 8:
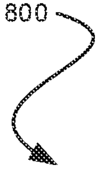
FIG. 8 is a flow-chart illustrating the steps of a method for machining a workpiece.
Figure 8:
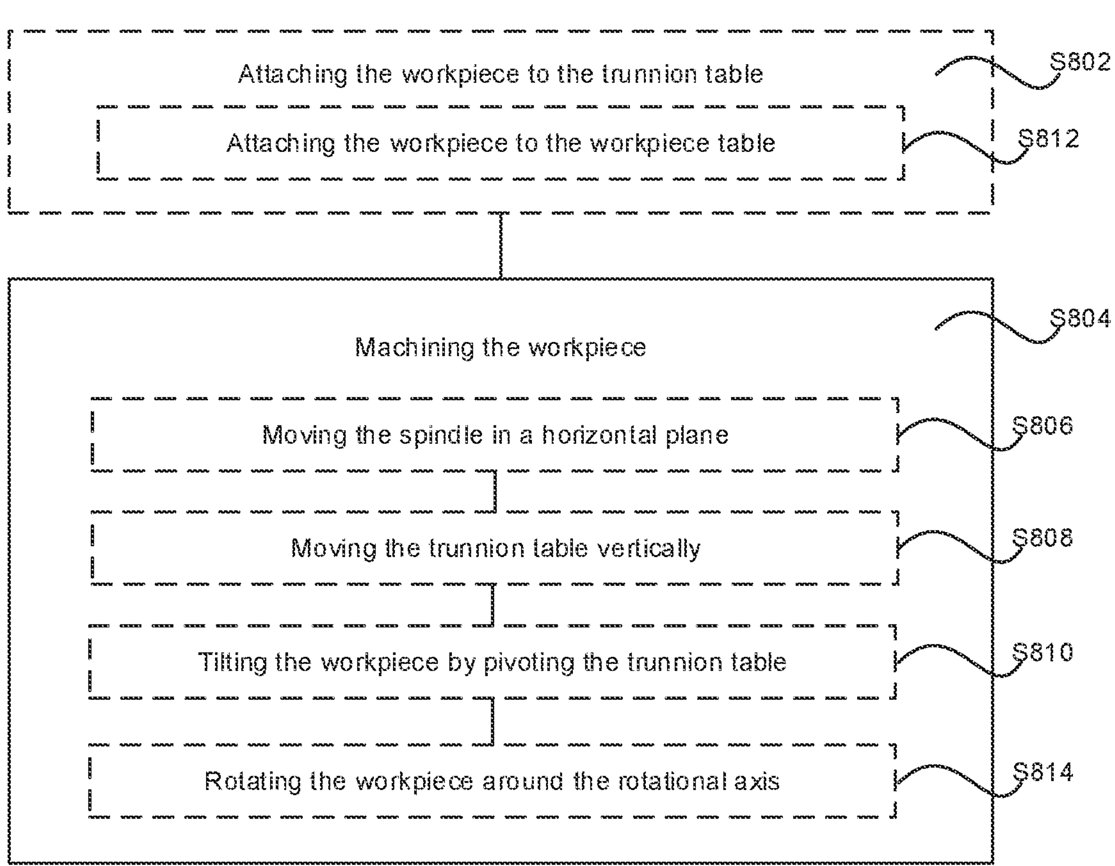

FIG. 8 is a flow-chart illustrating a method 800 for machining a workpiece using a machining device. The machining device may comprise a trunnion table holding the workpiece and a spindle holding a cutting tool directed upwards. The method 800 comprises a plurality of steps. Below the different steps will be discussed in more detail. It is noted that the steps may be executed in any suitable order.

The workpiece may be attached S802 to the trunnion table.

The workpiece is machined S804 from below by applying the cutting tool to the workpiece.

The workpiece is machined by moving S806 the spindle in a horizontal plane along a first and a second direction. The first direction may be orthogonal to the second direction.

The workpiece is machined by moving S808 the trunnion table vertically thereby moving the workpiece.

The workpiece is machined by tilting S810 the workpiece by pivoting the trunnion table around a pivot axis. The pivot axis may be parallel to the first direction.

The machining device may further comprise a workpiece table adapted to rotate around a rotational axis of itself and attached to the trunnion table.

The workpiece may be attached S812 to the workpiece table.

The workpiece may be machined by rotating S814 the workpiece around the rotational axis of the workpiece table. The rotational axis may be orthogonal to the pivot axis.

Even though described in a certain order, the different steps may also be performed in other orders, as well as multiple times. For instance, moving the spindle, moving the trunnion table, tilting the workpiece and rotating the workpiece may be done simultaneously.

From the description above follows that, although various embodiments have been described and shown, the present disclosure is not restricted thereto, but may also be embodied in other ways within the scope of the subject-matter defined in the following claims.

The invention claimed is:

1. A machining device comprising:

a stationary support having a side structure and a top portion disposed at an upper end of the side structure;

a trunnion table coupled to the side structure of the stationary support, the trunnion table having a mounting surface adapted to hold a workpiece and arranged to pivot relative to the stationary support around a pivot axis by means of a pivoting motor, wherein the pivot axis is parallel to a horizontal plane and the mounting surface of the trunnion table is spaced apart from the pivot axis, such that the mounting surface is configured to revolve around the pivot axis at a distance;

a spindle adapted to hold a rotary cutting tool directed continuously upwards, the spindle arranged to be moved in a plane parallel to the horizontal plane by a spindle transporting device; and a trunnion table transporting device adapted to vertically transport the trunnion table relative to the stationary support towards and away from the rotary cutting tool;

wherein the top portion of the stationary support includes an opening, and the trunnion table is configured to selectively align the mounting surface with the opening in an upward-facing orientation such that the mounting surface is accessible for loading and unloading the workpiece through the opening.

2. The machining device according to claim 1, wherein the machining device further comprises:

a workpiece table comprising the mounting surface of the trunnion table, the workpiece table rotatably connected to the trunnion table and adapted to hold the workpiece;

wherein the workpiece table is arranged to rotate around a rotational axis; and wherein the rotational axis is orthogonal to the pivot axis.

3. The machining device according to claim 2, comprising an additional workpiece table rotatably connected to the trunnion table and adapted to hold an additional workpiece;

wherein the additional workpiece table is arranged to rotate around an additional rotational axis; and wherein the additional rotational axis is orthogonal to the pivot axis.

4. The machining device according to claim 1, wherein the machining device comprises an additional spindle, and wherein the additional spindle is adapted to hold an additional rotary cutting tool directed continuously upwards, the additional spindle arranged to be moved in the plane parallel to the horizontal plane by the spindle transporting device.

5. The machining device according to claim 1, wherein the stationary support further comprises, a base structure; and wherein the side structure of the stationary support is connected at a first end to the base structure;

wherein the side structure is connected at a second end to the top portion of the stationary support structure;

wherein the trunnion table transporting device is connected to the side structure of the stationary support; and wherein the spindle transporting device is connected to the base structure of the stationary support.

6. The machining device according to claim 5, wherein the trunnion table transporting device is connected to the side structure of the stationary support at two opposite ends, such that the trunnion table is supported by the trunnion table transporting device at two opposite ends.

7. The machining device according to claim 5, wherein the side structure of the stationary support comprises at least one opening for loading and/or unloading the workpiece horizontally.

8. The machining device according to claim 5, wherein the spindle is movably arranged on the spindle transporting device along a first direction by means of a first motor;

wherein the spindle transporting device is movably arranged on the base structure of the stationary support along a second direction by means of a second motor;

wherein the first direction and the second direction are parallel to the horizontal plane; and wherein the first direction is orthogonal to the second direction.

9. The machining device according to claim 8, wherein the pivot axis is parallel to the first direction.

10. The machining device according to claim 5, wherein the spindle transporting device moves along rails attached to the base structure of the stationary support.

11. The machining device according to claim 1, further comprising a chip conveyor arranged below the spindle for transporting chips away from the machining device.

12. The machining device of claim 1, wherein the plane parallel to the horizontal plane is fixed, and the spindle is arranged to be moved only in the fixed plane.

13. The machining device of claim 1, wherein the spindle is configured to have exactly two degrees of freedom in the plane parallel to the horizontal plane.

14. The machining device of claim 1, further comprising the workpiece, wherein a portion of the workpiece extends through the opening of the stationary support when the mounting surface is aligned with the opening.

15. The machining device of claim 1, wherein the mounting surface of the trunnion table is configured to face away from the rotary cutting tool when in the upward-facing orientation.

16. A method for machining a workpiece using a machining device comprising a stationary support having a side structure and a top portion disposed at an upper end of the side structure, a trunnion table coupled to the side structure of the stationary support and holding the workpiece, and a spindle holding a rotary cutting tool directed continually upwards, the method comprising:

machining the workpiece from below by applying the cutting tool to the workpiece by:

moving the spindle in a horizontal plane along a first and a second direction, wherein the first direction is orthogonal to the second direction;

moving the trunnion table vertically thereby moving the workpiece; and tilting the workpiece by pivoting the trunnion table relative to the stationary support around a pivot axis, wherein the pivot axis is parallel to the first direction; and unloading the workpiece from the trunnion table by:

moving the trunnion table to align the workpiece with an opening disposed in the top portion of the stationary support; and removing the workpiece from the trunnion table through the opening.

17. The method according to claim 16, wherein the machining device further comprises a workpiece table coupled to the trunnion table and adapted to rotate around an internal rotational axis of itself;

wherein the workpiece is attached to the workpiece table, and wherein the method further comprises:

rotating the workpiece around the rotational axis of the workpiece table, wherein the rotational axis is orthogonal to the pivot axis.

18. A non-transitory computer-readable storage medium having stored thereon program code portions for implementing the method according to claim 16 when executed on a device having processing capabilities.

* * * * *